United States Patent [19]

Eddleman

[11] 4,171,250

[45] Oct. 16, 1979

[54] METHOD FOR ZINC ORE EXTRACTION

[75] Inventor: William L. Eddleman, Houston, Tex.

[73] Assignees: David B. Dean, Houston; Douglas B. Hayden, Jr., Beaumont, both of Tex.; part interest to each

[21] Appl. No.: 909,432

[22] Filed: May 25, 1978

Related U.S. Application Data

[63] Continuation of Ser. No. 737,728, Nov. 1, 1976, abandoned, which is a continuation of Ser. No. 626,912, Oct. 29, 1975, abandoned.

[51] Int. Cl.² .......................... C25C 1/16; C25C 7/04
[52] U.S. Cl. ...................................... 204/119; 204/296
[58] Field of Search ............... 204/119, 117, 128, 296, 204/105 R, 263, 264

[56] References Cited

U.S. PATENT DOCUMENTS

| | | | |
|---|---|---|---|
| 1,303,226 | 5/1919 | Allen | 204/119 |
| 3,103,474 | 9/1963 | Juda | 204/105 R |
| 3,679,538 | 7/1972 | Druin et al. | 161/159 |
| 3,694,281 | 9/1972 | Le Duc | 204/296 |

OTHER PUBLICATIONS

Ind. Eng. Chem., Prod. Res. Develop., vol. 13, No. 1, 1974, pp. 2-9.
Celgard Microporous Polypropylene Film, Technical Bulletins, issued by Celanese Corporation.

*Primary Examiner*—T. M. Tufariello
*Attorney, Agent, or Firm*—Sigalos & Levine

[57] ABSTRACT

A method and apparatus for extraction of zinc ore is disclosed. The zinc ore is mixed with a dilute acid, typically sulfuric acid, in a leaching process and is thereafter filtered through an appropriate number of stages. The filtration removes some of the heavier metals such as lead. Purification removes other elements, typically copper and cadmium. After purification, the filtrate is introduced on the cathode side of a tank having an anode and cathode separated by a permeable diaphragm. The elemental zinc deposits on the cathode while reconstituted acid accumulates on the anode side. The acid is recovered and recycled to the leaching step. The rate of recovery of zinc at the cathode is substantial.

7 Claims, 1 Drawing Figure

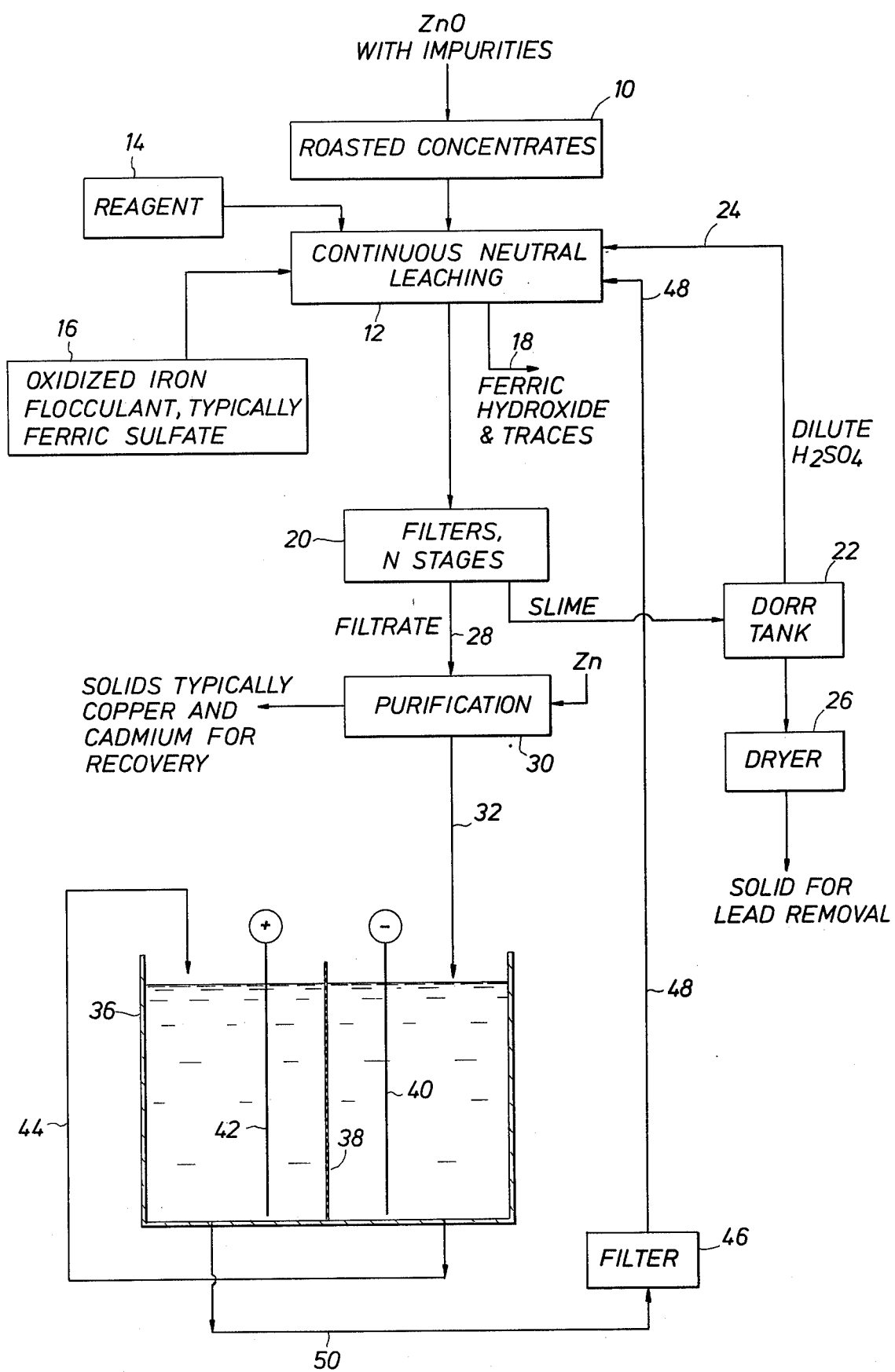

METHOD FOR ZINC ORE EXTRACTION

This disclosure is a continuation of application Ser. No. 737,728, filed Nov. 1, 1976, abandoned, which is, in turn, a continuation of application Ser. No. 626,912 filed Oct. 29, 1975, now abandoned.

BACKGROUND OF THE INVENTION

In the production of zinc from zinc ores, the current procedure is typified by that described beginning on page 183 of the 1959 book by C. H. Mathewson entitled *Zinc—the Science and Technology of the Metal, Its Alloys and Compounds*. At page 183, the recovery technique currently used at many places is described. In the flow chart exemplified at FIG. 6–12 of that text, electrolizing cells are provided with a filtrate of zinc in acid solution. The typical concentration heretofore provided has been in the range of about 70 grams per liter. The process heretofore has removed about 10 grams per liter of zinc or about 14%. It has also reconstituted about 15 grams per liter of sulfuric acid. The outflow after processing has been approximately sixty grams per liter of zinc remaining in solution typically as zinc sulfate mixed with some reconstituted sulfuric acid. The outflow has been recycled to the leach step with some added ore concentrates so that the process is repeated in cyclical fashion with feedback on a continuous operation basis. It is apparent that the bulk (about 85%) of the purified feed stock is recontaminated on its return to the leaching step. The inefficiency of the process has been overcome by this invention.

An examination of the approximate rates of removal mentioned above illustrates amply the excessive cost of this process. The cost is excessive because only about 14% of the zinc is recovered at the electrolyzing step. When the electrolyzing step is completed, approximately 86%, more or less, must be recycled or completely reprocessed through the various leaching and filtration steps. The limits on process efficiency result from the acid attack on the plated zinc. The zinc is redissolved into solution when the acid is too strong. One limit on the process is the existence in the electrolyte of different organic chemicals in solution or suspension that either carry electrical charges, or as electrically neutral molecules in the waters of hydration.

It has been discovered that the electrolyzing cell can be modified and a new technique of removal of the zinc from the zinc sulfate solution is disclosed. The method of this disclosure is particularly advantageous in that it is substantially more efficient. Instead of removing only about 14% in a typical situation, it differs in that it cooperates with the supply of zinc sulfate having a concentration of up to about 200 grams of zinc per liter. It removes up to about 95% of the zinc leaving about 10 grams per liter in the discharge from the new and improved removal cell disclosed herein. Thus, rather than recycle up to about 86% of the zinc originally supplied to the removal apparatus, only about 5% of it is recycled. This either reduces the size of the refining apparatus or enables the handling of substantially larger volumes of zinc ores at a given refinery. In any case, the volumes recycled through the method of this invention are substantially reduced thereby resulting in a reduction in cost to the apparatus and a streamlining of the production facility. The improved recovery rate is partly a result of the separation of respective ions into their respective electrode chambers by the process of stripping these ions of their waters of hydration; which waters of hydration can contain pollutants which interfere with the electrolytic process.

SUMMARY OF THE INVENTION

The present disclosure is directed to a method and an apparatus for extracting zinc in a zinc ore refining technique. The zinc ore is first leached by mixing with a dilute sulfuric acid. To the extent that the ore is impure and that other metals e.g. arsenic, copper, iron, etc., are present, these are removed by subsequent filtration and purification steps. The leaching step converts zinc oxide to zinc sulfate. The zinc sulfate is introduced into the cathode side of a cell provided with an anode and cathode separated by a permeable diaphragm. The diaphragm is provided with pores sized to enable passage of the anions of acid. The zinc deposits on the cathode. The pores block water movement across the diaphragm. Approximately 95% or more of the zinc is recovered at the cathode. This leaves only about 5% for recycling in a water and acid solution which is returned to the leaching step. The zinc is recovered from the cathode by suitable mechanical means such as breaking it away after it has formed on the cathode.

DESCRIPTION OF THE DRAWINGS

The single drawing is a flow chart of the process of the present invention which also includes an electrodialysis cell.

DESCRIPTION OF THE PREFERRED EMBODIMENT

This invention is directed to a method and apparatus for treating zinc ore. Zinc from a suitable zinc mine is supplied in a substantial quantity. It is normally crushed to a specified screen size and roasted (calcined) to convert the sulfides to oxides. It typically will include trace metals. The process described hereinbelow will center on the handling of the calcined zinc ore itself, the zinc being mainly in the form of zinc oxide at this stage. Since it is difficult to predict the precise percentage makeup of the other metal impurities, a few will be noted here and the method normally accomodates their removal if they are in customary trace quantities. The precise trace metal content is subject to variation as in the percentage. The impurities will typically but not always include arsenic, antimony, copper, iron, cadium, cobalt, nickel, tin, germanium, selenium, tellurium, silica, alumina and many others. The ore is thus supplied with impurities in the feed stock.

The zinc oxide or ore in many forms with impurities is supplied. Preferably, it is ground, sized or screened, and roasted. The first step in the process is thus the provision of roasted zinc or concentrates at 10. In the flow chart illustrated, this will be presumed to be the beginning point although substantial handling and processing of the ore prior to this occurs or it is mechanically treated to achieve the conditions mentioned.

The roasted zinc ore concentrates from step 10 are then delivered to a vessel for continuous leaching. This is indicated at 12. For the leaching, a suitable acid such as sulfuric acid is added as represented at 14. In addition, the leaching process sometimes is enhanced by the addition of an oxidized iron flocculant as indicated at the step 16. A typical iron flocculant is ferric sulfate. It is preferable that the iron be in the ferric state. The size of the tank and the throughput are scale factors and can be readily varied.

The leaching step thus has added an appropriate acid and an oxidized iron flocculant and this permits the continuous removal of a ferric hydroxide. This is indicated in the step 18. Interestingly, many of the other metals in the ore and trace quantities come out at this step. Since they vary in percentage as well as the mix, it is difficult to state at this juncture precisely what trace elements will be recovered. Nevertheless, trace elements are recovered, particularly if the iron in the leaching step is at least about ten times the quantity of impurities to be removed.

The output of the leaching step 12 is delivered to a filtration step which is identified by the numeral 20 in the single drawing. An appropriate number of stages where N equals any whole number integer is indicated. A suitable type filter is the Burt filter. The output of the filtration step includes a slime recovery which is transferred for separation by a Dorr tank 22. The solids in the slime or the residue recovered from the filters are separated in the Dorr tank. A recovery of water and sulfuric acid is made and is provided in an output conduit 24. The conduit 24 is returned to the leaching step 12. It is input to the leaching tank. This enables some of the acid to be recycled. Of course, the liquid and the acid recovered from the Dorr tank represents the overflow therefrom, the overflow being provided to an appropriate filter and drying step 26. It is dried and forms a solid for a feed stock for a lead smelter for further treatment in the recovery of lead. This is a useful by-product of the zinc refining process disclosed herein. The filtrate from the several stages is transferred by a conduit 28. The filtrate is next delivered to the purification step 30. Typically, the product from the leaching step 10 will include some unleached zinc oxide, entrained zinc sulfate in solution, and zinc ferrite. In addition, soluable zinc salts including zinc sulfate will be present. At this juncture, the filtrate also includes mostly copper and cadmium and some of the trace impurities such as arsenic, anamony, cobalt, etc. The purification step 30 thus includes the injection of some ground zinc dust to a suitable screen size. The purification step thus forms a flow in a conduit 32 which is then supplied to an electrodialysis cell 36.

The cell 36 includes a tank of substantial volume. It is divided along a center line by a transverse permeable diaphragm 38. The diaphragm 38 is manufactured by the Celanese Plastics Corp., and is sold under the trademark "Celgard". This product by Celanese is an open-celled microporous polymer (polypropylene) film disclosed and described in U.S. Pat. No. 3,679,538, which is inherently hydrophobic and specially processed to provide a pore structure which provides a barrier to water and is the preferred membrane. Membranes made of other olefins can also be used so long as they have the same pore and water barrier properties as the polypropylene film and U.S. Pat. No. 3,679,538, discloses that suitable olefins for this purpose are polyethylene, poly-3-methyl butene-1, and the like, and copolymers thereof. The films (membranes) have a reduced bulk density as compared to the bulk density of the corresponding films having no open-celled structure, a crystallinity of about about 30 percent, a pore size of less than 5,000 angstroms, and a nitrogen flux greater than 35.4 and are prepared, as discussed in U.S. Pat. No. 3,679,538, by the consecutive steps of cold stretching, hot stretching, and heat-setting a non-porous, crystalline, elastic film made of a polymer discussed above. The preferred film is a polypropylene film with elongated pores which measure about 40 angstroms in width and up to about 400 angstroms in length. The nature of the pores and their size are such as to also block passage of the water of hydration. This open-celled microporous polymer diaphragm is characterized by having a reduced bulk density as compared to the bulk density of the corresponding polymer film having no open-celled structure, a crystallinity of above about 30%, a pore size of less than 5,000 angstroms, and a nitrogen flux, measured after one hour storage at 65° C., of more than 30. It extends above the surface of the liquid in the tank. The tank further includes an aluminum cathode 40 of plate like construction. The filtrate from the conduit 32 is introduced on the cathode side. The tank further encloses a lead or carbon anode 42. The two terminals are connected to a DC source with the polarity as indicated. A suitable voltage is in the range of about three to five volts.

The beginning condition of the liquid in the tank is sulfuric acid in water solution. The pH can be fairly low. The acid concentration on the cathode side must not be raised beyond a specified limit. If the cathode is exposed to acid of too great a strength, the acid will redissolve the zinc metal deposited on the cathode. The permeable membrane 38 assists in maintaining the pH in the cathode side where the cathode is surrounded by the catholyte solution. When the process begins, the fluid which is introduced is primarily zinc sulfate which is obtained as a result of the acidization of zinc ore. The zinc sulfate is introduced into the vicinity of the cathode 40. The zinc deposits onto the cathode 40 to free a sulfate anion. The sulfate anion goes into solution in the tank. The anion migrates through the permeable diaphragm 38 to the vicinity of the anode. This drops the pH of the anode side and raises the pH of the cathode side. This enables a heavier concentration of zinc sulfate to be introduced into the cell. In addition, it prevents the redissolution of deposited zinc back into solution as a result of the attack of regenerated acid. Rather, the pH in the catholyte will rise toward neutral. After it increases, the acid does not interfere with the deposition process occurring at the cathode.

Zinc is recovered at the cathode. Periodically, the cathode must be removed. The zinc forms a deposited layer on the cathode which is easily mechanically removed from the cathode. By way of example and not limitation, striking it with a sharp blow will remove the zinc. The cathode is replaced and a new deposit on the cathode is formed. The zinc tends to be somewhat brittle and is usually easily removed.

The numeral 44 identifies a conduit from the tank 36. It removes some of the catholyte solution. The catholyte solution is mildly acidic commonly having a pH typically in the range of about three to five. By and large, up to about 90% of the zinc originally present in the filtrate in the conduit 32 is removed. The acid and water recovered is then supplied to a conduit 44 which directs the water to the anode side where it is mixed with the concentrated acid and returns it via the conduit 50 to the filter 46 and then through a conduit 48 to the leach step 12.

The process as described at this juncture accumulates the sulfate anion in the vicinity of the anode which thereby forms sulfuric acid by combining with hydrogen disassociated at the anode. The numeral 50 identifies a conduit which removes a flow of fairly concentrated sulfuric acid from the vicinity of the anode. An appropriate percentage is mixed with the water and acid from the conduit 44 to thereby reduce the strength of the acid. The filter 46 removes dirt and carbon collected in the liquid before it is recycled. This inventive process can be used on a batch basis but it functions equally well on a continuous basis as explained. The repetitive cycle of acid flow continues indefinitely, requiring the addition only of makeup acid from time to time. In other words, the acid is introduced at the leaching step and a very substantial portion is recovered at the electrodialysis cell 36. This portion is returned for subsequent reuse. The zinc that is supplied in the ore is substantially recovered at the cell 36 typically in the amount approaching 90% of the available zinc. The percentage recovery can be varied by increasing or decreasing the dwell time of each step, the concentration of the mixtures at each step and the temperature for each step.

The foregoing is directed to the preferred embodiment and describes the method of operation of this process. However, the scope is determined by the claims which follow.

I claim:

1. A method of extracting zinc from calcined zinc ore comprising the steps of:
   leaching the zinc ore with an acid solution to form a zinc sulfate solution; and
   introducing the zinc sulfate solution into the cathode compartment of a container divided into anode and cathode compartments containing, respectively, an anode and a cathode by a microporous polymer diaphragm characterized by having a reduced bulk density as compared to the bulk density of the corresponding polymer film having no open-celled structure, a crystallinity of about about 30%, a pore size of less than 5,000 angstroms, and a nitrogen flux, measured after one hour storage at 65° C., of more than 30, permeable to cations and anions, inherently hydrophobic, and specially processed to provide a pore structure which provides a barrier to water molecules and water of hydration and passing a direct current between the anode and cathode to deposit elemental zinc on the cathode.

2. The method of claim 1 including the step of removing acid from the anode compartment for use in the leaching step.

3. The method of claim 1 including the step of purifying the zinc sulfate solution to remove other metals from the calcined zinc ore so that the zinc sulfate solution introduced into the container is free of other metals.

4. The method of claim 1 wherein said permeable dipahragm extends above the surface of the solution in the container, and including the step of removing the cathode periodically to remove elemental zinc plated thereon.

5. The method of claim 1 wherein said diaphragm is a hydrophobic, open-celled, microporous polypropylene film.

6. The method of claim 4 including the step of removing acid from the anode compartment, filtering the acid, and introducing the acid into a water solution of the zinc ore.

7. The method of claim 6 including the step of introducing water into the leaching step which water is obtained from the cathode compartment and which includes a trace of the zinc anion in solution such that up to about 90% of the zinc is recovered at the cathode and the remainder of the zinc in solution is recycled through the leaching step.

* * * * *

UNITED STATES PATENT AND TRADEMARK OFFICE
CERTIFICATE OF CORRECTION

PATENT NO. : 4,171,250
DATED : October 16, 1979
INVENTOR(S) : William L. Eddleman It is certified that error appears in the above-identified patent and that said Letters Patent are hereby corrected as shown below:

In column 5, line 33, "about about" should read
--above about--.

Signed and Sealed this

Fifteenth Day of January 1980

[SEAL]

Attest:

SIDNEY A. DIAMOND

Attesting Officer     Commissioner of Patents and Trademarks